United States Patent [19]
Sano et al.

[11] Patent Number: 5,432,236
[45] Date of Patent: Jul. 11, 1995

[54] PROCESS FOR PREPARING POLYOLEFINS

[75] Inventors: Akira Sano; Kunimichi Kubo, both of Tokyo; Kazuo Matsuura, Yokohama, all of Japan

[73] Assignee: Nippon Oil Company, Limited, Tokyo, Japan

[21] Appl. No.: 198,909

[22] Filed: Feb. 18, 1994

[30] Foreign Application Priority Data

Feb. 23, 1993 [JP] Japan .................................. 5-072732

[51] Int. Cl.6 .................................................. C08F 2/34
[52] U.S. Cl. ................................... 525/247; 525/319; 525/324; 526/79; 526/86; 526/88; 526/901; 526/908
[58] Field of Search ................... 526/86, 88, 124, 125, 526/901, 908, 79; 525/247, 324, 319

[56] References Cited

U.S. PATENT DOCUMENTS 5,208,109  5/1993  Bailly et al. ........................... 526/88

Primary Examiner—Romulo H. Delmendo
Attorney, Agent, or Firm—Dilworth & Barrese

[57] ABSTRACT

According to the present invention, in a vapor phase polymerization of olefins, there is provided an efficient polyolefin manufacturing process capable of preventing the formation of a sheet-like polymer and allowing an olefin polymerization reaction to be started stably. More particularly, there is provided a process of preparing a polyolefin by homopolymerizing or copolymerizing an olefin or olefins substantially in a vapor phase condition and in the presence of a catalyst comprising a solid catalyst component and an organometallic compound, the solid catalyst component containing magnesium, one or more elements selected from titanium and vanadium and also containing halogen, wherein, in feeding the catalyst into a reactor the interior of which is held substantially in a vapor phase condition, in the presence of a polyolefin serving as a medium for dispersing the catalyst and in a state not substantially inducing a polymerization reaction in the presence of only the said polyolefin serving as the said medium, to start homopolymerization or copolymerization of the olefin(s), a solid catalyst component satisfying the above condition and having an average particle diameter substantially larger than that of the solid catalyst component to be used in a principal stage of the polymerization reaction is used at least until an olefin homopolymer or copolymer is formed in an amount equal to the amount of the polyolefin used as the catalyst dispersing medium.

11 Claims, 1 Drawing Sheet

PROCESS FOR PREPARING POLYOLEFINS

BACKGROUND OF THE INVENTION

The present invention relates to a novel process for preparing polyolefins and more particularly to a process capable of initiating a polymerization reaction of olefins stably while preventing the formation of a sheet-like polymer in accordance with a vapor-phase polymerization method and thereby preparing polyolefins efficiently.

The vapor-phase polymerization method, which is one of polyolefin preparing methods, has recently been becoming most popular as an olefin preparing process because not only the removal of catalyst but also the removal and recovery of solvent are not necessary and hence the manufacturing cost is low. Usually, in a vapor-phase polymerization method of a fluidized bed type, the heat of polymerization generated in the polymerization reaction is removed using the sensible heat of circulating gas, so it is necessary that the polymer in the reactor be dispersed and fluidized uniformly and to a satisfactory extent. However, the polymer may be deposited on the reactor wall, thermometer, etc. due to static electricity generated by the friction between fluidized polymer particles or between polymer particles and the reactor wall, thus resulting in that the heat cannot be removed to a satisfactory extent and the polymer melts, causing the formation of agglomerated polymer or sheet-like polymer, which may cause the polymer withdrawing line to be closed and the operation stopped. Such a phenomenon is apt to occur when the interior of the reaction system is in an unsteady state at the time of start-up. As a method for preventing the generation of static electricity in the vapor phase reactor there has been proposed a method of adding, for example, water, alcohol, oxygen, nitrogen oxide or ketone (Japanese Patent Laid Open Nos. 230607/1989 and 145608/1990). However, all of those compounds have the drawback of deteriorating the polymerization activity.

It is the object of the present invention to remedy the above-mentioned drawbacks of the prior art, particularly provide a method for preventing the formation of a sheet-like polymer without deteriorating the polymerization activity.

SUMMARY OF THE INVENTION

The present invention resides in a process of preparing a polyolefin by homopolymerizing or copolymerizing olefin(s) substantially in a vapor phase condition and in the presence of a catalyst comprising a solid catalyst component and an organometallic compound, the solid catalyst component containing at least (a) magnesium, (b) titanium and/or vanadium and (c) halogen, wherein, in feeding the said catalyst into a reactor the interior of which is held substantially in a vapor phase condition, in the presence of a polyolefin serving as a medium for dispersing the catalyst and in a state not substantially inducing a polymerization reaction in the presence of only the polyolefin used as the medium, to start homopolymerization or copolymerization of the olefin(s), a solid catalyst component satisfying the said condition and having an average particle diameter substantially larger than that of the solid catalyst component to be used in a principal stage of the polymerization reaction is used at least until an olefin homopolymer or copolymer is formed in an amount equal to the amount of the polyolefin used as the catalyst dispersing medium.

Particularly, it is desirable to use two or more kinds of solid catalyst components different in average particle diameter successively in order of magnitude of average particle diameter and set the ratio of minimum to maximum average particle diameter in the range from 1:1.1 to 1:10.

By using the process of the present invention it is made possible to prepare polyolefins efficiently; for example, the formation of a sheet-like polymer can be prevented without deteriorating the polymerization activity, and the polymerization can be started in an extremely stable manner.

DETAILED DESCRIPTION OF THE INVENTION

Figure 1:
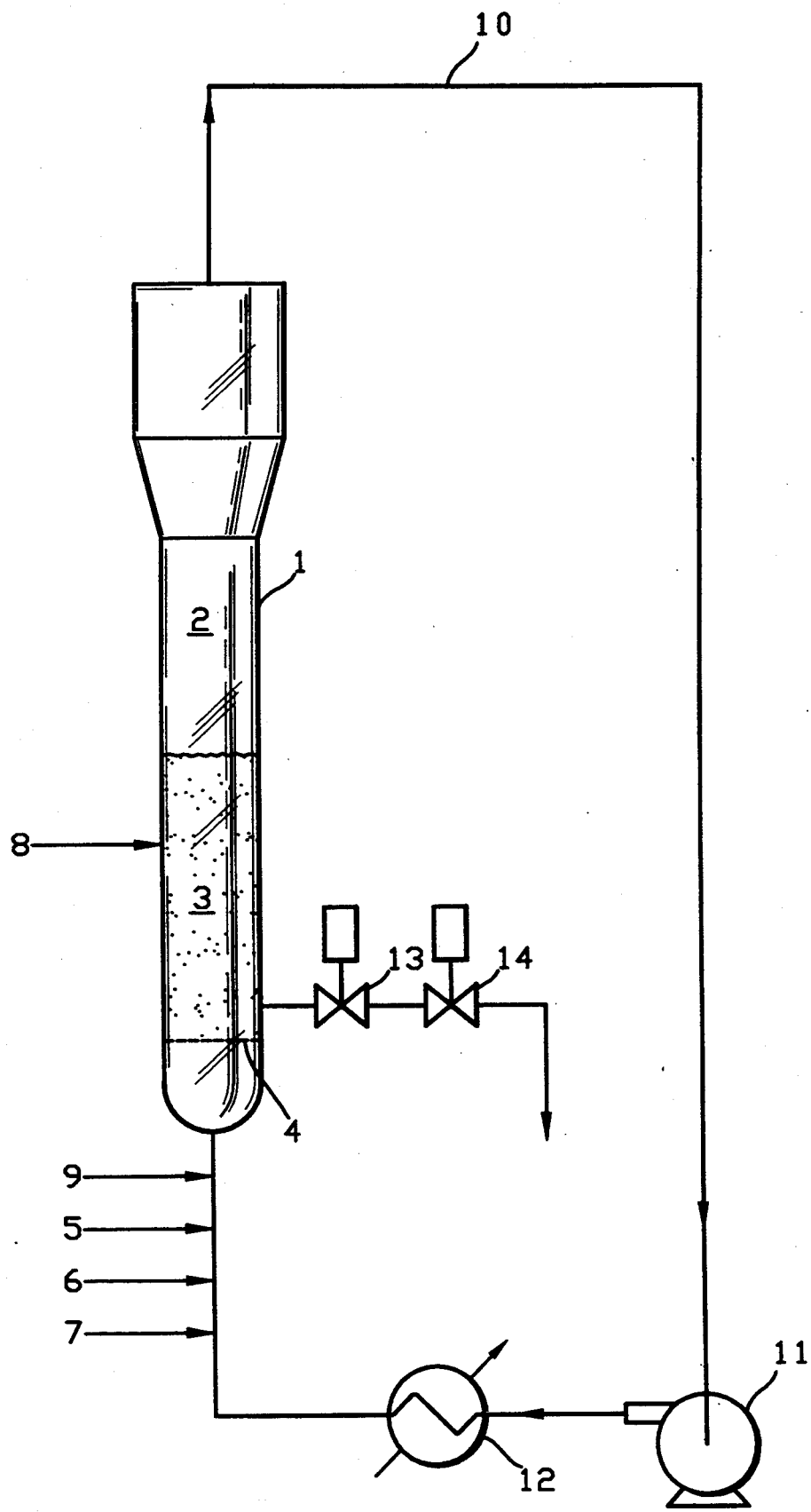
FIG. 1 is an explanatory view of a vapor-phase polymerization reaction system, in which the reference numeral 1 denotes a fluidized bed reactor, the numeral 2 denotes an upper space zone, numeral 3 denotes a fluidized bed zone, numeral 4 a gas dispersing plate, numeral 5 a promotor supply pipe, numeral 6 a hydrogen supply pipe, numeral 7 an olefin supply pipe, numeral 8 a catalyst supply pipe, numeral 9 nitrogen supply pipe, numeral 10 a gas circulation pipe, numeral 11 a blower, numeral 12 a condenser, and numerals 13 and 14 denote polymer particle discharge valves.

The present invention will be described concretely hereinunder.

The solid catalyst component used in the present invention is not specially limited if only it contains at least magnesium, titanium and/or vanadium and halogen. Usually, this component is obtained by mutually contacting a magnesium compound, a titanium compound and/or a vanadium compound, etc.

The magnesium compound is not specially limited, but as an example there is mentioned a compound represented by the following general formula:

$$Mg(OR)_n X_{2-n}$$

where R is a hydrocarbon radical having 1 to 20 carbon atoms, X is a halogen atom and n is $0 \leq n \leq 2$. More concrete examples are such compounds as magnesium fluoride, magnesium chloride, magnesium bromide, magnesium iodide, methoxychloromagnesium, ethoxychloromagnesium, n-Propoxychloromagnesium, iso-propoxychloromagnesium, n-butoxychloromagnesium, sec-butoxychloromagnesium, tert-butoxychloromagnesium, methoxybromomagnesium, ethoxybromomagnesium, n-propoxybromomagnesium, iso-propoxybromomagnesium, n-butoxybromomagnesium, sec-butoxybromomagnesium, tert-butoxybromomagnesium, dimethoxymagnesium, diethoxymagnesium, di-n-propoxymagnesium, di-iso-propoxymagnesium, di-n-butoxymagnesium, di-sec-butoxymagnesium, and di-tert-butoxymagnesium, with magnesium chloride being particularly preferred.

These magnesium compounds may have been treated with an electron donor such as, for example, one selected from alcohols, esters, ketones, carboxylic acids, ethers, amines and phosphines.

Further, as the magnesium compound there may be used a compound obtained by reacting any of the magnesium compounds exemplified above with a compound represented by the following general formula:

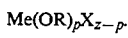

where Me is an element of Groups I to IV in the Periodic Table, z is the valence of Me, p is $0 < p \leq z$, X is a halogen atom, provided Rs may be the same or different.

For example, mention may be made of various compounds represented by NaOR, $Mg(OR)_2$, $Mg(OR)X$, $Ca(OR)_2$, $Zn(OR)_2$, $Cd(OR)_2$, $B(OR)_3$, $Al(OR)_3$, $Al(OR)_2X$, $Al(OR)X_2$, $Si(OR)_4$, $Si(OR)_3X$, $Si(OR)_2X_2$, $Si(OR)X_3$ and $Sn(OR)_4$. More concrete and preferred examples include diethoxymagnesium, ethoxychloromagnesium, trimethoxyaluminum, triethoxyaluminum, tri-n-propoxyaluminum, tri-iso-propoxyaluminum, tri-n-butoxyaluminum, tri-sec-butoxyaluminum, tri-tert-butoxyaluminum, dimethoxychloroaluminum, diethoxychloroaluminum, ethoxydichloroaluminum, diisopropoxychloroaluminum, isopropoxydichloroaluminum, triphenoxyaluminum, diphenoxychloroaluminum, phenoxydichloroaluminum, trimethylphenoxyaluminum, dimethylphenoxychloroaluminum, methylphenoxydichloroaluminum, tribenzoxyaluminum, tetraethoxysilane, triethoxychlorosilane, diethoxydichlorosilane, ethoxytrichlorosilane, tetraphenoxysilane, triphenoxychlorosilane, diphenoxydichlorosilane, phenoxytrichlorosilane, and tetrabenzoxysilane.

The foregoing titanium compound is not specially limited, but as an example there is mentioned a compound represented by the following general formula:

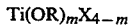

where R is a hydrocarbon radical having 1 to 20 carbon atoms, X is a halogen atom and m is $0 \leq m \leq 4$. Concrete examples include titanium tetrahalides such as titanium tetrachloride, titanium tetrabromide and titanium tetraiodide, as well as monomethoxytrichlorotitanium, dimethoxydichlorotitanium, trimethoxymonochlorotitanium, tetramethoxytitanium, monoethoxytrichlorotitanium, monoethoxytrifluorotitanium, monoethoxytribromotitanium, diethoxydifluorotitanium, diethoxydichlorotitanium, diethoxydibromotitanium, triethoxyfluorotitanium, triethoxychlorotitanium, tetraethoxytitanium, monopropoxytrichlorotitanium, monoisopropoxytrichlorotitanium, dipropoxydichlorotitanium, diisopropoxydichlorotitanium, diisopropoxydibromotitanium, triisopropoxyfluorotitanium, tripropoxychlorotitanium, tetra-n-propoxytitanium, tetraisopropoxytitanium, monobutoxytrichlorotitanium, monoisobutoxytrichlorotitanium, dibutoxydichlorotitanium, tributoxyfluorotitanium, tributoxychlorotitanium, triisobutoxychlorotitanium, tetra-n-butoxytitanium, tetraisobutoxytitanium, tetra-sec-butoxytitanium, tetra-tert-butoxytitanium, monopentoxytrichlorotitanium, dipentoxydichlorotitanium, tripentoxymonochlorotitanium, tetra-n-pentyloxytitanium, tetracyclopentyloxytitanium, monooctyloxytrichlorotitanium, dioctyloxydichlorotitanium, trioctyloxymonochlorotitanium, tetra-n-hexyloxytitanium, tetracyclohexyloxytitanium, tetra-n-heptyloxytitanium, tetra-n-octyloxytitanium, tetra-2-ethylhexyloxytitanium, mono-2-ethylhexyloxytrichlorotitanium, di-2-ethylhexydichlorotitanium, tri-2-ethylhexyloxymonochlorotitanium, tetra-nonyloxytitanium, tetradecyloxytitanium, tetraisobornyloxytitanium, tetraoleyloxytitanium, tetraallyloxytitanium, tetrabenzyloxytitanium, tetrabenzhydryloxytitanium, monophenoxytrichlorotitanium, diphenoxydichlorotitanium, triphenoxychlorotitanium, tri-o-xyleneoxychlorotitanium, tetraphenoxytitanium, tetra-o-methylphenoxytitanium, tetra-m-methylphenoxytitanium, tetra-1-naphthyloxytitanium, tetra-2-naphthyloxytitanium, and mixtures thereof.

Particularly, titanium tetrachloride, monoethoxytrichlorotitanium, diethoxydichlorotitanium, monobutoxytrichlorotitanium, dibutoxydichlorotitanium, tetraethoxytitanium, tetraisopropoxytitanium, tetra-n-butoxytitanium, tetra-n-hexyloxytitanium, tetra-n-octyloxytitanium and tetra-2-ethylhexyloxytitanium are preferred.

As examples of the foregoing vanadium compound there are mentioned tetravalent vanadium compounds such as vanadium tetrachloride, vanadium tetrabromide and vanadium tetraiodide, pentavalent vanadium compounds such as vanadium oxytrichloride and orthoalkyl vanadate, and trivalent vanadium compounds such as vanadaium trichloride and vanadium triethoxide. The vanadium compound may be used alone or in combination with the titanium compound.

Organic compounds such as, for example, alcohols, phenols, ethers, ketones, esters, amines or nitriles may be added to the titanium compound and the magnesium compound, or may be made present as solvents, and reaction may be allowed to take place. Of those organic compounds, alcohols are particularly preferred. Examples are methanol, ethanol, 1-propanol, 2-propanol, 1-butanol, 2-methyl-1-propanol, 2-butanol, 2-methyl-1-propanol, 1-pentanol, 2-pentanol, 3-3-pentanol, 2-methyl-1-butanol, 3-methyl-1-butanol, 2-methyl-2-butanol, 3-methyl-2-butanol, 2,2-dimethyl-1-propanol, 1-hexanol, 2-methyl-1-pentanol, 4-methyl-1-pentanol, 4-methyl-2-pentanol, 2-ethyl-1-butanol, 1-heptanol, 2-heptanol, 3-heptanol, 4-heptanol, 2,4-dimethyl-3-pentanol, 1-octanol, 2-octanol, 2-ethyl-1-hexanol, 3,5-dimethyl-1-hexanol, 2,2,4-trimethyl-1-pentanol, 1-nonanol, 5-nonanol, 3,5-dimethyl-4-heptanol, 2,6-dimethyl-4-heptanol, 3,5,5-trimethyl-1-hexanol, 1-decanol, 1-undecanol, 1-dodecanol, 2,6,8-trimethyl-4-nonanol, 1-tridecanol, 1-pentadecanol, 1-hexadecanol, 1-heptadecanol, 1-octadecanol, 1-octadecanol, 1-nonadecanol, 1-eicosanol, phenol, chlorophenol, benzyl alcohol, methyl cellosolve, and mixtures thereof. Particularly, 2-methyl-1-pentanol, 4-methyl-1-pentanol, 4-methyl-2-pentanol, 2-ethyl-1-butanol, 2,4-dimethyl-3-pentanol, 2-ethyl-1-hexanol, 3,5-dimethyl-1-hexanol, 2,2,4-trimethyl-1-pentanol, 3,5-dimethyl-4-heptanol, 2,6-dimethyl-4-heptanol and 3,5,5-trimethyl-1-hexanol are preferred.

Of course, there may be used various denatured alcohols called methanol-denatured alcohols and hexane-denatured alcohols, which are available commercially as industrial alcohols.

It is also preferable to adopt a method wherein a silicon oxide and/or an aluminum oxide are added to the titanium compound and the magnesium compound and reaction is allowed to take place.

The said silicon oxide indicates silica or a double oxide of silicon with at least one kind of another metal selected from those belonging to Groups I to VIII of the Periodic Table.

The said aluminum oxide indicates alumina or a double oxide of aluminum with at least one kind of another metal selected from those belonging to Groups I to VIII of the Periodic Table.

As typical examples of double oxides of silicon or aluminum with at least one kind of another metal selected from Groups I–VIII of the Periodic Table, mention may be made of such various natural and synthetic double oxides as $Al_2O_3.MgO$, $Al_2O_3.CaO$, $Al_2O_3.SiO_2$, $Al_2O_3.MgO.CaO$, $Al_2O_3.MgO.SiO_2$, $Al_2O_3.CuO$, $Al_2O_3.Fe_2O_3$, $Al_2O_3.NiO$ and $SiO_2.MgO$.

These formulae are not molecular formulae but represent only compositions. The structure and component ratio of the double oxide to be used in the invention are not specially limited. It goes without saying that the silicon oxide and/or aluminum oxide to be used in the invention may contain a small amount of water absorbed therein or may contain a small of impurities.

Properties of such silicon oxide and/or aluminum oxide are not specially limited as long as they do not impair the object of the present invention. But, it is desirable to use a silica having a particle diameter of 1 to 200 μm, a pore volume of not smaller than 0.3 ml/g and a surface area of not smaller than 50 m²/g.

It is also desirable that the silicon oxide and/or aluminum oxide be calcined at a temperature of 200° to 800° C. by a conventional method before use.

Further, there may be adopted a method wherein a silicon compound is used in addition to the above titanium compound, magnesium compound and silicon oxide and/or aluminum oxide and these compounds are reacted together. As such silicon compound there may be used a compound represented by the following general formula:

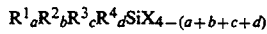

$$R^1_a R^2_b R^3_c R^4_d SiX_{4-(a+b+c+d)}$$

where $R^1$, $R^2$, $R^3$ and $R^4$ which may be the same or different, are each independently hydrogen, a hydrocarbon radical, such as an alkyl, aryl or aralkyl radical, having 1 to 20, preferably 1 to 12, carbon atoms, $-NR^5$ or $-OR^5$ where $R^5$ is hydrogen or a hydrocarbon radical, such as an alkyl, aryl or aralkyl radical, having 1 to 20, preferably 1 to 12, carbon atoms, X is a halogen atom such as fluorine, chlorine, bromine or iodine, and a, b, c and d are respectively in the ranges of $0 \leq a < 4$, $0 \leq b < 4$, $0 \leq c < 4$ and $0 \leq d < 4$, with the limitation that the condition of $0 \leq a+b+c+d \leq 4$, preferably $0 < a+b+c+d \leq 4$, is satisfied.

As examples of such silicon compound there are mentioned tetraethoxysilane, triethoxychlorosilane, diethoxydichlorosilane, ethoxytrichlorosilane, tetraphenoxysilane, triphenoxychlorosilane, diphenoxydichlorosilane, phenoxytrichlorosilane, tetrabenzoxysilane, dimethyldimethoxysilane, dimethyldiethoxysilane, diethyldiethoxysilane, bisdimethylaminodimethylsilane, and silicon tetrachloride.

There also may be adopted a method wherein an organoaluminum compound is used in addition to the foregoing titanium compound, magnesium compound and silicon oxide and/or aluminum oxide and these compounds are reacted together. As the said organoaluminum compound there may be used a compound represented by the following general formula:

$$R_n AlX_{3-n}$$

where R is hydrogen, a hydrocarbon radical, such as an alkyl, aryl or aralkyl radical, having 1 to 20, preferably 1 to 12, carbon atoms, or $-OR'$ where $R'$ is hydrogen or a hydrocarbon radical, such as an alkyl, aryl or aralkyl radical, having 1 to 20, preferably 1 to 12, carbon atoms, X is a halogen atom such as fluorine, chlorine, bromine or iodine, and n is in the ranges of $0 \leq n < 3$, provided in the case of $n > 1$, Rs may be the same or different.

As examples of such organoaluminum compound there are mentioned trimethylaluminum, triethylaluminum, triisobutylaluminum, trihexylaluminum, diethylaluminum chloride, ethylaluminum sesquichloride and ethylaluminum dichloride.

As to the method for preparing the solid catalyst component used in the invention and containing magnesium, titanium and/or vanadium and halogen as essential components, no special limitation is placed thereon. There may be adopted a method wherein the foregoing titanium compound, magnesium compound, etc. are copulverized at a temperature of 0° to 200° C., for 30 minutes to 50 hours, in the presence or absence of an inert hydrocarbon solvent, using, for example, ball mill, vibration mill, rod mill or impact mill. There also may be adopted a method wherein reaction is allowed to proceed in an organic solvent such as, for example, one selected from inert hydrocarbons, alcohols, phenols, ethers, ketones, esters, amines, nitriles, and mixtures thereof, at a temperature of 20° to 300° C. for 5 minutes to 10 hours, and thereafter the solvent is removed by evaporation.

As to the reaction ratio of components, it is not specially limited, but is preferably in the range from 0.001 to 1,000, more preferably 0.01 to 100, still more preferably 0.05 to 10.

As examples of the solid catalyst component there are mentioned those described in JP63-63561B, JP63-63681B, JP1-10528B, JP1-11651B, JP1-12286B, JP1-12289B, JP1-35846B, JP1-35844B, JP1-35845B, JP60-149605A, JP62-32105A, JP61-207306A, JP63-61008A, JP3-35004A, JP3-64306A, JP3-153707A, JP3-185004A, JP3-252407A, JP3-121103A and JP4-261408A.

The ratio of the minimum to the maximum average particle diameter in two or more solid catalyst components of different average particle diameters employable in the invention is in the range from 1:1.1 to 1:10, preferably 1:1.2 to 1:5, more preferably 1:1.5 to 1:3. If this ratio is lower than 1.1, the particle size of the resulting polymer will be small, so that in an electrostatically unsteady state at the beginning of the polymerization, the polymer particles are apt to cause adhesion and hence a sheet-like polymer is formed easily. On the other hand, if the said ratio is greater than 10, the particle size of the resulting polymer will be too large, so that the bulk density of the polymer becomes lower and hence the fluidity thereof is deteriorated, thus causing easy formation of a sheet-like polymer.

An average particle diameter of the solid catalyst component used in the main stage of the polymerization reaction in the present invention corresponds to that of the solid catalyst component used in a stable, or steady, state of the polymerization reaction, and although an optimum value thereof differs depending on each solid catalyst component, it can be determined easily on the basis of the amount of the resulting polymer jumping out from the reactor, the particle size or bulk density of the polymer withdrawn from the reactor, the degree of fish eye when the polymer is formed into film, etc.

Generally speaking, the average particle diameter in question is in the range of 5 to 150 μm, preferably 10 to 120 μm, more preferably 20 to 100 μm.

In the case of using three or more solid catalyst components of different average particle diameters, the one which is the smallest in average particle diameter is usually employed in the main stage (at least a principal portion from a steady state up to the end) of the polymerization reaction.

In the present invention, it is necessary that the solid catalyst component used at the beginning of the polymerization reaction have a maximum average particle diameter. This average particle diameter is not specially limited if only it is substantially different from the foregoing minimum average particle diameter to the extent of satisfying the minimum to the maximum average particle diameter ratio referred to above. But the average particle diameter of the initially-used solid catalyst component is usually in the range of 6 to 500 $\mu$m, preferably 50 to 300 $\mu$m, more preferably 100 to 200 $\mu$m.

In the case of combining such plural solid catalyst components of different average particle diameters, it is desirable that other conditions (for example, the kind and ratio of catalyst constituents) than the average particle diameter be made coincident.

It is necessary that the amount of polymer formed using the initial solid catalyst component having the largest average particle diameter out of plural solid catalyst components different in average particle diameter be at least equal to, preferably at least three times, more preferably at least ten times, the amount (weight) of the olefin polymer (seed polymer) used as a catalyst dispersing medium. However, such polymer formed by using the solid catalyst component large in average particle diameter may cause clogging of the screen mesh of an extruder at the time of granulation or may result in increase of fish eye when formed into film.

Therefore, it is preferable that after a predetermined amount of polymer has been formed using such solid catalyst component larger in average particle diameter, a change be made successively to solid catalylst components smaller in average particle diameter and that in the foregoing steady state there be used a solid catalyst component smallest in average particle diameter.

Although the reason why the formation of a sheet-like polymer can be prevented by using a solid catalyst component having a large average particle diameter is not clear, it is presumed that large polymer particles formed by the combination of a solid catalyst component having a large average particle diamter with an organometallic compound will be greater in their moving force (propelling force) induced by the circulating gas or agitation than in an electrostatic force acting to hold charged particles in the vicinity of the reactor wall. Particularly, at the beginning of the polymerization the interior of the reactor is unstable, and if a solid catalyst component having a large average particle diamter is used in this stage, it will be possible to prevent the formation of a sheet-like polymer no matter how unstable the reactor interior may be.

No special limitation is place on how to prepare each solid catalyst component having a desired average particle diameter for use in the invention. For example, any of the following methods is adoptable:

1) a method wherein the feed containing at least the foregoing magnesium compound and titanium compound and/or vanadium compound is copulverized, followed by calssifying;
2) a method wherein the feed containing at least the foregoing magnesium compound and titanium compound and/or vanadium compound is reacted in an organic solvent, then the solvent is removed by evaporation, followed by calssifying;
3) a method wherein the magnesium compound is dissolved in water or an organic solvent, followed by spray drying to obtian particles having a desired average particle diameter, and the other feed materials such as the titanium compound and/or the vanadium compound are supported on the particles;
4) a method wherein the foregoing silicon compound and/or aluminum compound are (is) subjected to calssifying to obtain particles having a desired average particle diameter, and then the other feed materials such as the foregoing magnesium compound and titanium compound and/or vanadium compound are reacted with the particles and supported thereon;
5) a method wherein, in preparing the foregoing silicon compound and/or aluminum compound a desired average particle diameter is obtained by a conventional means capable of changing the average particle diameter, for example by changing the spraying pressure and angle from nozzle in a spray drying process or changing the disc revolution, the concentration of the starting slurry, etc., and then the other feed materials such as the foregoing magnesium compound and titanium compound and/or vanadium compound are reacted with the particles and supported thereon; and
6) a method wherein the solid catalyst component obtained in any of the above methods 1) to 5) is further subjected to prepolymerization to obtain a solid ctalyst component having a desired average particle diameter.

As the organometallic compound used in the present invention there may be used an organometallic compound of a Group I-IV metal in the Periodic Table which is known as one component of a Ziegler catalyst. Particluarly preferred examples are organoaluminum compounds and organozinc compounds such as those represented by the general formulae $R_3Al$, $R_2AlX$, $RAlX_2$, $R_2AlOR$, $RAl(OR)X$ and $R_3Al_2X_3$ where Rs, which may be the same or different, are each an alkyl or alkyl radical having 1 to 20 carbon atoms and X is a halogen atom, and those represented by the general formula R Zn where Rs, which may be the same or different, are each an alkyl radical having 1 to 20 carbon atoms. More concrete examples include trimethylaluminum, triethylaluminum, triisopropylaluminum, triisobutylaluminum, tri-sec-butylaluminum, tri-tert-butylaluminum, trihexylaluminum, trioctylaluminum, diethylaluminum chloride, diisopropylaluminum chloride, ethylaluminum sesquichloride, diethylzinc, and mixtures thereof.

The amount of the organometallic compound to be used is not specially limited, but is usually in the range of 0.1 to 1,000 mol of the titanium compound.

The organometallic compound may be used as a mixture or addition compound with an organic acid ester. In the case of using it as a mixture with an organic acid ester, the organic acid ester is used usually in an amount of 0.1 to 1 mol, preferably 0.2 to 0.5 mol, per mol of the organometallic compound. In the case of using the organometallic compound as an addition compound with an organic acid ester, it is preferable that the organometallic compound: organic acid ester mol ratio be in the range from 2:1 to 1:2.

The organic acid ester indicataes an ester of a saturated or unsaturated, mono- or dibasic organocarboxylic acid having 1 to 24 carbon atoms with an alcohol having 1 to 30 carbon atoms. As examples there are mentioned methyl formate, ethyl acetate, amyl acetate, phenyl acetate, octyl acetate, methyl methacrylate, ethyl stearate, methyl benzoate, ethyl benzoate, n-propyl benzoate, di-propyl benzoate, butyl benzoate, hexyl benzoate, cyclopentyl benzoate, cyclohexyl benzoate, phenyl benzoate, 4-tolyl benzoate, methyl salicylate, ethyl salicylate, methyl p-p-hydroxybenzoate, ethyl p-hydroxybenzoate, phenyl salicylate, cyclohexyl p-hydroxybenzoate, benzyl salicylate, ethyl α-resorcinol carboxylate, methyl anisate, ethyl anisate, phenyl anisate, benzylanisate, ethyl o-methoxybenzoate, methyl p-ethoxybenzoate, methyl p-toluylate, ethyl p-toluylate, pheyl p-toluylate, ethyl o-toluylate, ethyl m-toluylate, methyl p-aminobenzoate, ethyl p-aminobenzoate, vinyl benzoate, allyl benzoate, benzyl benzoate, methyl naphthoate and ethyl naphthoate. Above all, alkyl esters of benzoic acid, o- or p-toluic acid or p-anisic acid are preferred, and particularly methyl and ethyl esters thereof are preferred.

The polymerization reaction is carried out substantially in an oxygen- and water-free condition and substantially in vapor phase. Polymerization conditions involve temperatures ranging from 20° to 120° C., preferably from 50° to 100° C., and pressures ranging from atmospheric pressure to 70 kg/cm$^2$, preferably 2 to 60 kg/cm . The molecular weight can be adjusted to some extent by changing polymerization conditions such as the polymerization temperature and the catalyst mol ratio, but the addition of hydrogen into the polymerization system is more effective for this purpose. Of course, using the catalyst according to the present invention, it is possible to effect multi-stage polymerization reactions of two or more stages involving different polymerization conditions such as different hydrogen concentrations and different polymerization temperatures.

In the present invention, the reactor to be used for homopolymerizing or copolymerizing olefin(s) in vapor phase may be substantially any of all the fluidized bed type reactors that are operated in gas-solid system. It is optional whether the reactor to be used is equipped with a stirrer or not.

For starting the vapor-phase polymerization, first the interior of the reactor is dried thoroughly, then the olefin polymer serving as a catalyst dispersing medium (designated the seed polymer) is fed in an appropriate amount, again followed by drying to a thorough extent. Thereafter, gases such as olefin, hydrogen and nitrogen gases are fed, and after the polymerization temperature and pressure have reached predetermined certain levels, the supply of the catalyst is started. In this case, regarding in what order the solid catalyst component and the organometallic compound both constituting the catalyst are to be fed, there is no special limitation.

The process of the present invention is applicable to the polymerization of all olefins that can be polymerized using a Ziegler type catalyst. As such olefins, α-olefins having 2 to 12 carbon atoms are particularly preferred. For example, the process of the present invention is suitable for the homopolymerization of such α-olefins as ethylene, propylene, 1-butene, hexene-1 and 4-methylpentene-1, copolymerization of ethylene and α-olefins having 3 to 12 carbon atoms, such as ethylene/propylene, ethylene/1-butene, ethylene/hexene-1 and ethylene/4-methylpentene-1, copolymerization of propylene and 1-butene, and copolymerization of ethylene and two or more kinds of other α-olefins.

For the purpose of modification of the resulting olefin polymer or copolymer there may be used as an additional comonomer a diene compound such as butadiene, 1,4-hexadiene, ethylidene norbornene or dicyclopentadiene.

In the case of copolymerization, a suitable comonomer content can be selected, but in the case where ethylene and an α-olefin of $C_3$ to $C_{12}$ are to be copolymerized, it is desirable that the α-olefin content of the resulting ethylene/α-olefin copolymer be usually not higher than 40 mol %, preferably not higher than 30 mol %, more preferably not higher than 20 mol %.

The following examples are given in illustration of, not in limitation of, the present invention.

<How to Measure the Particle Diameter of Solid Catalyst Component>

A particle size distribution was measured using Master Sizer (a product of Marburn Instruments Co.), and a 50% particle diameter value thereof was used as an average particle diameter of the solid catalyst component concerned.

<Preparation of Solid Catalyst Components>
(Solid Catalyst Component, A-1)

A three-necked 500 ml flask equipped with a stirrer and a reflux condenser was purged with nitrogen, into which was placed 50 g of a silica (600° C. 3-hr calcinate) having an average particle diameter of 120 μm which had been obtained by adjusting spray-drying conditions, then 160 ml of dehydrated hexane and 2.2 ml of titanium tetrachloride were added and reaction was allowed to take place under the reflux of hexane for 3 hours.

After cooling, 30 ml off a 1 mmol/cc solution of diethylaluminum chloride solution in hexane was added and reaction was again allowed to proceed at hexane reflux for 2 hours, followed by drying under reduced pressure at 120° C. to remove the hexane.

10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled at room temperature in a nitrogen atmosphere for 16 hours to obtain a reaction product.

5.4 g of the said reaction product was dissolved in 160 ml of dehydrated ethanol and the whole quantity of the resulting solution was added into the three-necked flask. Reaction was allowed to take place under the reflux of ethanol for 3 hours, followed by drying under reduced pressure at 150° C. for 6 hours, to obtain a solid catalyst component having an average particle diameter of 121 μm.

(Solid Catalyst Component, A-2)

A solid catalyst component having an average particle diameter of 53 μm was prepared in the same way as in the above method for preparing the solid catalyst component A-1 except that a silica having an average particle diameter of 52 μm was used in place of the silica having an average particle diamter of 120 μm.

(Solid Catalyst Component, B-1)

10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled at room temperature in a nitrogen atmosphere for 16 hours to obtain a reaction product.

A three-necked flask equipped with a stirrer and a reflux condenser was purged with nitrogen, into which were then placed 100 g of dehydrated 2-methyl-1-pentanol, 5.0 g of the reaction product of the anhydrous magnesium chloride and triethoxyaluminum prepared above, and 10.0 g of tetraethoxytitanium, and reaction was allowed to take place at 80° C. for 1 hour. After cooling to room temperature, 46 g of a silica (400° C. 3-hr calcinate) having an average particle diameter of 146 μm which had been obtained by adjusting spray-drying conditions was added and again reaction was allowed to proceed at 80° C. for 2 hours, followed by drying under reduced pressure at 120° C. for 2 hours, to afford a solid powder. Subsequently, 100 cc of dehydrated hexane and 10.0 g of diethylaluminum chloride were added and reaction was allowed to take place at room temperature for 1 hour, followed by blowing of nitrogen at 60° C. for 3 hours to remove the hexane. As a result, there was obtained a solid catalyst component having an average particle diameter of 146 μm.

(Solid Catalyst Component, B-2)

A solid catalyst component having an average particle diameter of 90 μm was prepared in the same way as in the above method for preparing the solid catalyst component B-1 except that a silica having an average particle diameter of 90 μm was used in place of the silica having an average particle diamter of 146 μm.

Solid Catalyst Component, B-3)

A solid catalyst component having an average particle diameter of 38 μm was prepared in the same way as in the above method for preparing the solid catalyst component S-1 except that a silica having an average particle diameter of 38 μm was used in place of the silica 146 μm in average particle diamter.

(Solid Catalyst Component, C-1)

10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled at room temperature in a nitrogen atmosphere for 16 hours to obtain a reaction product.

A three-necked flask equipped with a stirrer and a reflux condenser was purged with nitrogen, into which were then charged 5 g of the reaction product prepared above and 5 g of a silica (600° C. 3-hr calcinate) having an average particle diameter of 120 μm which had been obtained by classifying, then 100 ml of tetrahydrofuran was added and reaction was allowed to take place at 60° C. for 2 hours, followed by drying under reduced pressure at 120° C. to remove the tetrahydrofuran. Next, 50 ml of hexane and 1.1 ml of titanium tetrachloride were added and reaction was allowed to proceed under the reflux of hexane for 2 hours, followed by blowing of nitrogen at 60° C. for 3 hours to remove the hexane.

The resulting solid powder was put into 50 ml of hexane, then 1 ml of tetraethoxysilane was added and reaction was allowed to take place at hexane reflux for 2 hours, followed by blowing of nitrogen at 60° C. for 3 hours to remove the hexane. As a result, there was obtained a solid catalyst component having an average particle diameter of 122 μm.

(Solid Catalyst Component, C-2)

A solid catalyst component having an average particle diameter of 49 μm was prepared in the same manner as in the above method for preparing the solid catalyst component C-1 except: that the 120 μm silica was substituted by a silica of 48 μm.

(Solid Catalyst Component, D-1)

10 g of a commercially available, anhydrous magnesium chloride and 4.2 g of triethoxyaluminum were charged into a stainless steel pot having an internal volume of 400 ml and containing 25 stainless steel balls each ½ inch in diameter, and ball-milled at room temperature in a nitrogen atmosphere for 16 hours to obtain a reaction product.

A three-necked flask equipped with a stirrer and a reflux condenser was purged with nitrogen, into which was then placed 5 g of a silica (600° C. 3-hr calcinate) having an average particle diameter of 130 μm which had been obtained by classifying, then 100 ml of tetrahydrofuran was added and reaction was allowed to take place at 60° C. for 2 hours, followed by drying under reduced pressure at 120° C. to remove the tetrahydrofuran. Next, 3 ml of silicon tetrachloride was added and reaction was allowed to proceed at 60° C. for 2 hours, then 1.6 ml of titanium tetrachloride was added and reacted at 130° C. for 2 hours to afford a solid catalyst component having an average particle diameter of 133 μm.

(Solid Catalyst Component, D-2)

A solid catalyst component having an average particle diameter of 63 μm was prepared in the same manner as in the above method for preparing the solid catalyst component D-1 except that the 130 μm silica was substituted by a silica of 60 μm.

<Vapor Phase Polymerization>

(EXAMPLE 1)

There was used a fluidized bed reactor 1 having a diameter of 25 cm, which was the same as that shown in FIG. 1. First, the entire vapor-phase polymerization system was dried thoroughly with hot nitrogen and thereafter 12 kg of a predried, linear low-density polyethylene having an average particle diameter of 750 μm was fed as a seed polymer into the reactor. Then, the reaction system was pressurized to a nitrogen pressure of 5 kg/cm$^2$G and drying was conducted at 85° C. for 12 hours under circulation of the nitrogen gas using a blower 12. Thereafter, starting gases were fed so as to give a nitrogen concentration of 25 mol %, a 1-butene/ethylene mol ratio of 0.41 and a hydrogen/ethylene mol ratio of 0.09, and the total pressure was adjusted to 20 kg/cm$^2$G. At this time there occurred no polymerization reaction. Subsequently, a solution of triethylaluminum in hexane and the solid catalyst component A-1 (average particle diameter: 121 μm) were fed at rates of 1.1 g/hr as triethylaluminum and 0.9 g/hr, respectively, through a catalyst supply pipe 8 and polymerization was started. The amount of polymer produced became larger gradually after the stare of the polymerization. The operation was continued while the polymer was withdrawn intermittently so as to maintain the polymer quantity in the reactor at 12 kg and while keeping constant the gas composition in the reactor. After 12 hours, the amount of polymer produced was 4.0 kg/hr. In 3 hours (the total amount of polymer produced after the start of the reaction: 36 kg) after the amount of polymer produced had reached 4.0 kg/hr, the solid catalyst component A-1 was substituted by A-2 (average particle diameter: 53 μm) and polymerization was performed continuously for 7 days. During this period, neither agglomerated polymer nor sheet-like polymer was found in the withdrawn polymer and the operation was continued in good condition at an amount of polymer produced of 4.0 kg/hr.

MFR and density of the resulting polymer were 0.85 g/10 min and 0.9201 g/cm$^3$, respectively. After the end of the operation, the reactor was opened and inspected to find that there was no deposition of polymer on the reactor wall, thermometer, etc.

(EXAMPLE 2)

The same vapor-phase polymerization reactor as in Example 1 was used and there were conducted drying of the system interior, introduction of the seed polymer and subsequent drying in the same way as in Example 1. Thereafter, starting gases were fed so as to give a nitrogen concentration of 25 mol %, a 1-butene/ethylene mol ratio of 0.38 and a hydrogen/ethylene mol ratio of 0.09, and the total pressure was adjusted to 20 kg/cm$^2$G. At this time there occurred no polymerization reaction. Subsequently, a solution of triethylaluminum in hexane and the solid catalyst component B-1 (average particle diameter: 146 μm) were fed at rates of 1.1 g/hr as triethylaluminum and 0.9 g/hr, respectively, through a catalyst supply pipe 8 and polymerization was started. After the start of the polymerization, the amount of polymer produced became larger gradually. The operation was continued while the polymer was withdrawn intermittently so as to maintain the polymer quantity in the reactor at 12 kg and while keeping constant the gas composition in the reactor. As a result, after 12 hours, the amount of polymer produced was 4.5 kg/hr. In 2 hours (the total amount of polymer produced after the start of the reaction: 36 kg) after the amount of polymer produced had reached 4.5 kg/hr, the solid catalyst component B-1 was substituted by B-2 (average particle diameter: 90 μm) and polymerization was further performed for 6 hours. Thereafter, the solid catalyst component was changed to B-3 (average particle diameter: 38 μm) and polymerization was conducted continuously for 7 days. During this period, neither agglomerated polymer nor sheet-like polymer was found in the withdrawn polymer and the operation was continued in good condition at an amount of polymer produced of 4.5 kg/hr.

MFR and density of the resulting polymer were 0.98 g/10 min and 0.9198 g/cm$^3$, respectively. After the end of the operation, the reactor was opened and inspected to find that there was no deposition of polymer on the reactor wall, thermometer, etc.

(EXAMPLE 3)

The same vapor-phase polymerization reactor as in Example 1 was used and there were conducted drying of the system interior, introduction of the seed polymer and subsequent drying in the same way as in Example 1. Thereafter, starting gases were fed so as to give a nitrogen concentration of 25 mol %, a 1-butene/ethylene mol ratio of 0.35 and a hydrogen/ethylene mol ratio of 0.11, and the total pressure was adjusted to 20 kg/cm$^2$G. At this time there occurred no polymerization reaction. Subsequently, a solution of triethylaluminum in hexane and the solid catalyst component C-1 (average particle diameter: 1,232 μm) were fed at rates of 1.1 g/hr as triethylaluminum and 0.9 g/hr, respectively, through a catalyst supply pipe 8 and polymerization was started. After the start of the polymerization, the amount of polymer produced became larger gradually. The operation was continued while the polymer was withdrawn intermittently so as to maintain the polymer quantity in the reactor at 12 kg and while keeping constant the gas composition in the reactor. As a result, after 12 hours, the amount of polymer produced was 3.7 kg/hr. In 12 hours (the total amount of polymer produced after the start of the reaction: 68.4 kg) after the amount of polymer produced had reached 3.7 kg/hr, the solid catalyst component C-1 was substituted by C-2 (average particle diameter: 49 μm) and polymerization was performed continuously for 7 days. During this period, neither agglomerated polymer nor sheetlike polymer was found in the withdrawn polymer and the operation was continued in good condition at an amount of polymer produced of 3.7 kg/hr.

MFR and density of the resulting polymer were 1.05 g/10 min and 0.9215 g/cm$^3$, respectively. After the end of the operation, the reactor was opened and inspected to find that there was no deposition of polymer on the reactor wall, thermometer, etc.

(EXAMPLE 4)

The same vapor-phase polymerization reactor as in Example 1 was used and there were conducted drying of the system interior, introduction of the seed polymer and subsequent drying in the same way as in Example 1. Thereafter, starting gases were fed so as to give a nitrogen concentration of 25 mol %, a 1-butene/ethylene mol ratio of 0.29 and a hydrogen/ethylene mol ratio of 0.08, and the total pressure was adjusted to 20 kg/cm$^2$G. At this time there occurred no polymerization reaction. Subsequently, a solution of triethylaluminum in hexane and the solid catalyst component D-1 (average particle diameter: 133 μm) were fed at rates of 1.1 g/hr as triethylaluminum and 0.9 g/hr, respectively, through a catalyst supply pipe 8 and polymerization was started. After the start of the polymerization, the amount of polymer produced became larger gradually. The operation was continued while the polymer was withdrawn intermittently so as to maintain the polymer quantity in the reactor at 12 kg and while keeping constant the gas composition in the reactor. As a result, after 12 hours, tile amount of polymer produced was 4.2 kg/hr. In 3 hours (the total amount of polymer produced after the start of the reaction: 37.8 kg) after the amount of polymer produced had reached 4.2 kg/hr, the solid catalyst component D-1 was substituted by D-2 (average particle diameter: 63 μm) and polymerization was performed continuously for 7 days. During this period, neither agglomerated polymer nor sheet-like polymer was found in the withdrawn polymer and the operation was continued in good condition at an amount of polymer produced of 4.2 kg/hr.

MFR and density of the resulting polymer were 1.21 g/10 min and 0.9190 g/cm$^3$, respectively. After the end of the operation, the reactor was opened and inspected to find that there was no deposition of polymer on the reactor wall, thermometer, etc.

(Comparative Example 1)

The same vapor-phase polymerization reactor as in Example 1 was used and there were performed drying of the system interior, introduction of the seed polymer and subsequent drying in the same way as in Example 1. Thereafter, starting gases were fed so as to give a nitrogen concentration of 25 mol %, a 1-butene/ethylene mol ratio of 0.38 and a hydrogen/ethylene mol ratio of 0.09, and the total pressure was adjusted to 20 kg/cm$^2$G. Subsequently, a solution of triethylaluminum in hexane and the solid catalyst component B-3 (average particle diameter: 38 μm) were fed respectively at a rate of 1.1 g/hr as triethylaluminum and also at a rate of 1.1 g/hr, and polymerization was started. The operation was continued while withdrawing polymer intermittently so as to maintain the polymer quantity in the reactor at 12 kg and while keeping constant the gas composition in the reactor. In 3 hours after the start of the polymerization and thereafter, sheet-like polymer about 5 mm thick and about 2 cm square was found in the withdrawn polymer. The size of the sheet-like polymer gradually increased.

After 12 hours, the operation was stopped and the reactor was opened and inspected to find that a sheet-like polymer having a thickness of about 5 mm and a size of about 10 cm×20 cm was deposited along the reactor wall.

(Comparative Example 2)

The same vapor-phase polymerization reactor as in Example 1 was used and there were performed drying of the system interior, introduction of the seed polymer and subsequent drying in the same manner as in Example 1. Thereafter, starting gases were fed so as to give a nitrogen concentration of 25 mol %, a 1-butene/ethylene mol ratio of 0.29 and a hydrogen/ethylene mol ratio of 0.08, and the total pressure was adjusted to 20 kg/cm²G. Subsequently, a solution of triethylaluminum in hexane and the solid catalyst component D-2 (average particle diameter: 63 μm) were fed at rates of 1.1 g/hr and 0.9 g/hr, respectively, and polymerization was started. The operation was continued while withdrawing polymer so as to maintain the polymer quantity in the reactor at 12 kg and while keeping the gas composition in the reactor constant.

In 1 hour after the start of the polymerization and thereafter, sheet-like polymer about 5 mm thick and about 2 cm square was found in the withdrawn polymer. The size of the sheet-like polymer increased gradually.

After 6 hours, the operation was stopped and the reactor was opened and inspected to find that a sheet-like polymer having a thickness of about 5 mm and a size of about 5 cm×100 cm was deposited along the reactor wall.

In the vapor-phase polymerization process according to the present invention, as set forth hereinabove, solid catalyst components of different particle diameters are used successively in the early stage of the polymerization, whereby the formation of a sheet-like polymer can be prevented without deteriorating the polymerization activity and therefore it is possible to start the polymerization reaction of olefin stably and prepare a polyolefin efficiently.

What is claimed is:
1. A process of preparing a polyolefin comprising:
   (a) providing a first solid catalyst component containing: magnesium; one or more elements selected from the group consisting of titanium and vanadium; and halogen,
   (b) maintaining the interior of a reactor substantially in a vapor phase condition,
   (c) introducing a polyolefin dispersing medium and one or more olefins to be polymerized into the reactor-under conditions not substantially inducing polymerization,
   (d) feeding said first catalyst component, and an organometallic compound into the reactor,
   (e) polymerizing said one or more olefins in the presence of said first solid catalyst component until an olefin polymer is formed in an amount at least equal to the amount of the polyolefin dispersing medium; and
   (f) feeding a second solid catalyst component into the reactor to start a principal polymerization stage, said second solid catalyst component being compositionally the same or different from said first solid catalyst component provided that the second solid catalyst component contains: magnesium; one or more compounds selected from the group consisting of titanium and vanadium; and halogen, and having a particle size smaller than the particle size of said first solid catalyst component, the ratio of minimum to maximum average particle diameter of said first and second solid catalyst components being in the range from 1:1.1 to 1:10.

2. The process of claim 1, wherein said first and second solid catalyst components are different.

3. The process of claim 1, wherein the ratio of minimum to maximum average particle diameter of said first and second solid catalyst components is in the range from 1:1.2 to 1:5.

4. The process of claim 1, wherein the first solid catalyst component has an average particle diameter in the range from 6 to 500 μm.

5. The process of claim 1, wherein said first solid catalyst component is a product obtained by the reaction of a magnesium compound and a titanium compound.

6. The process of claim 5, wherein said magnesium compound is a compound represented by the following general formula:

$$Mg(OR)_n X_{2-n}$$

where R is a hydrocarbon radical having 1 to 20 carbon atoms, X is a halogen atom and n is in the range of $0 \leq n \leq 2$.

7. The process of claim 5, wherein said magnesium compound has been treated with an electron donor.

8. The process of claim 5, wherein as said magnesium compound there is used a compound obtained by reacting the magnesium compound with a compound represented by the following general formula:

$$Me(OR)_p X_{z-p}$$

where Me is a Group I–IV element of the Periodic Table, z is the valence of the element Me, p is $0 < p \leq z$, X is a halogen atom and Rs, which may be the same or different, are each independently a hydrocarbon radical having 1 to 20 carbon atoms.

9. The process of claim 5, wherein as said titanium compound is a compound represented by the following general formula:

$$Ti(OR)_m X_{4-m}$$

where R is a hydrocarbon radical having 1 to 20 carbon atoms, X is a halogen atom and m is in the range of $0 \leq m \leq 4$.

10. The process of claim 1, wherein said first solid catalyst component contains magnesium, titanium and halogen.

11. The process of claim 5, wherein said solid catalyst component is a product obtained by further reacting the titanium compound and the magnesium compound with at least one oxide selected from silicon oxides and aluminum oxides.

* * * * *